United States Patent [19]

Hofer et al.

[11] Patent Number: 4,997,604

[45] Date of Patent: Mar. 5, 1991

[54] METHOD FOR PRODUCTION OF MOLDED ARTICLES OF SILICON NITRIDE

[75] Inventors: Beat Hofer, Derendingen; Bernhard Einstein, Heimberg, both of Switzerland

[73] Assignee: HTM AG, Biel, Switzerland

[21] Appl. No.: 457,382

[22] Filed: Dec. 27, 1989

[30] Foreign Application Priority Data

Jan. 4, 1989 [CH] Switzerland .............................. 16/89

[51] Int. Cl.$^5$ .............................................. C04B 35/65
[52] U.S. Cl. ........................................ 264/65; 423/344
[58] Field of Search ........................... 264/65; 423/344

[56] References Cited

U.S. PATENT DOCUMENTS 3,591,337  7/1971  Lumbey .............................. 423/344
3,839,540 10/1974  Arrol et al. ........................... 423/344
4,687,655  8/1987  Hunold et al. ....................... 423/344

FOREIGN PATENT DOCUMENTS 55-71672  5/1980  Japan .
654564    2/1986  Switzerland .
1546928   5/1979  United Kingdom .

Primary Examiner—James Derrington
Attorney, Agent, or Firm—Zarley, McKee, Thomte, Voorhees, & Sease

[57] ABSTRACT

A reactively combined silicon nitride is produced in which the starting material is pure silicon powder or a powder mixture of pure silicon and its nitride. This material is subjected to cold isostatic pressing or a slip casting or diecasting process before it is brought into a hot isostatic mold. The reaction is triggered under a nitrogen pressure of initially 0.5–2.0 MPa and at a starting temperature of 1000° C. During the reaction the pressure is raised to 4.9 MPa and the temperature to at most 1420° C. This raising of pressure and temperature is carried out at least partially stepwise. Obtained thereby is a product having a degree of nitriding greater than 92%. With a cycle time of less than 24 hours, the process permits molded articles to be produced which have a wall thickness of more than 10 mm, the material being uniformly nitrided.

13 Claims, No Drawings

METHOD FOR PRODUCTION OF MOLDED ARTICLES OF SILICON NITRIDE

The invention relates to a method for production of molded articles from reactively combined silicon nitride. Pure silicon powder or a powder mixture of pure silicon and silicon nitride serves as the starting material. The starting material is subjected to heating under nitrogen pressure.

The production of such reactively combined silicon nitride has been known already for some time. $Si_3N_4$ possesses an extraordinary thermal spalling resistance, a high degree of firmness and corrosion resistance. This ceramic material is therefore used in industry as mechanically resistant material in gas pipes, for chlorene, casting dies, turbine components, for sealing ledges of Wankel (RC) engines and vehicle turbines.

The strong exothermal character of the nitridation reaction (9.3 kJ/kg) limits the production of components with wall thicknesses of more than 10 mm. The thicker the molded piece the more heat generated. This can easily lead to temperatures which are above the melting point of silicon (1423° C.), thereby resulting in silicon melting on the inside of the molded piece. The fluid silicon crystals bake together and form a firm, coherent phase, which no longer allows itself to be nitrided.

If a lower reaction temperature is chosen in order to avoid this melting phase, then only the outer zones are 100% nitrided. Since the reaction is associated with an $N_2$ enrichment, the volume increases the most in the first reaction zone (shell) and impedes further diffusion of nitrogen in the interior. The silicon crystals in the middle no longer receive enough nitrogen to nitride fully into $Si_3N_4$. Phases of free silicon and inferior stoichiometrical Si-N compounds are produced.

It has been attempted, therefore, using higher $N_2$ pressures, to obtain a complete nitriding of the molded article.

In the Japanese Patent Application No. 78/143,934 (Patent 1980/71672), a method for production of metallic nitride molding material is described, in which metallic powder, for example, silicon powder, is preformed in a certain shape and sintered in nitrogen gas, the said pre-formed mass being brought to react in a high-pressure tank at high temperature and under high pressure of nitrogen. To achieve a sufficiently good result, an $N_2$ pressure of at least 50 kg/cm² is recommended. Optimally, however, 300 kg/cm² and more is recommended to obtain a significant effect. The temperatures for nitriding at first lie below the melting point of the metallic powder to be nitrided, and in a second reaction above this melting point. Silicon powder with a grain size of 100 mesh (about 149 μm) was selected as the starting material.

In the U.S. Pat. No. 4,687,655 (18 August 1987/ priority date 19 Apr. 1985), a method is described for production of molded articles from reactively combined silicon nitride in which nitriding is performed with a nitrogen gas pressure of at least 6 MPa and the temperature is raised in a first stage to a point below the melting point of silicon, and the temperature in a second stage to above the melting point of silicon. In the first stage the temperature is maintained for at least 0.5 hours, while the higher temperature in the second stage is maintained for 1-7 hours. Powder with a grain size of 5 to 15 μm serves as starting material.

In the Swiss patent CH-A-654,564 a method is described in which molded articles of silicon nitride are produced, nitriding taking place under nitrogen pressure of at least 100 bar and a temperature of at least 1200° C. Si powder with a grain size smaller than 30 μm served as starting material.

In the British patent GB-A-1,546,928 (31 May 1979), a method for production of silicon nitride is described in which a green compact is produced through pre-sintering of silicon powder at a temperature between 1250° C. and a temperature below the melting point of silicon. This green compact is afterwards brought to react at a nitrogen pressure below or above atmospheric pressure and at a temperature between 1100° C. and a temperature below the melting point of silicon, a polycrystalline silicon nitride substance being obtained with a density of 79% to 92% of the theoretical density of silicon nitride. Up to 10% by volume of silicon is contained in the silicon nitride obtained. The indicated cycle time usually far exceeds 24 hours, and the forming of the green compact takes place, as a rule, in an argon atmosphere.

All the known methods mentioned above have the disadvantage that with a cycle time of less than 24 hours only molded pieces can be produced with a maximal wall thickness of 10 mm. Experiments have proven that pieces produced according to these methods having a wall thickness of less than 10 mm are not fully nitrided through on the inside, and, in the case of wall thicknesses greater than 10 mm, display a coherent phase of Si melting on the inside, due to the powerful exothermic reaction. This phase no longer permits nitriding.

The aim of the present invention, consequently, is to make available a new method which allows molded articles with wall thicknesses of more than 10 mm to be nitrided without any problems and moreover with a degree of nitridation of 92 to 100%.

The subject matter of the present invention is therefore the method defined in claim 1.

Underlying the invention is the realization that temperatures exceeding the melting point of silicon, namely 1423° C., must not be allowed to prevail on the inside of the article, and, in order not to hinder the further diffusion of nitrogen on the interior of the molded article, the porous outer zones must not be allowed to close up during the initial phase of the reaction.

The beginning of the reaction must take place at a minimal furnace temperature of about 1000° C. The reaction rate is steered primarily by a precise pressure control in the autoclave to avoid overheating of the silicon. The furnace temperature is raised only when the reaction is advanced, and the reaction rate thereby being additionally kept under control by the furnace temperature. This method course permits the cycle time to be kept at a minimum.

In the following example, the method according to the invention will be explained in more detail.

EXAMPLE 1

Silicon powder with an average grain size of less than 20 μm was pressed with a cold isostatic press into plates having the dimensions (mm):

260 × 130 × 10
260 × 130 × 18
260 × 130 × 25

260 × 130 × 30.

Plates produced in this way were stacked on top of each other, with spaces of at least 2 mm being maintained between the individual plates. This way heat removal during the exothermic reaction is ensured. A load prepared in this way was brought into a hot isostatic pressing facility, and raised to an initial reaction temperature of 1040° C. under light nitrogen pressure. The nitrogen pressure at this temperature amounted to 1 MPa (10 bar).

Afterwards the pressure and the temperature were raised step-by-step from 1.0 to 4.9 MPa (10 to 49 bar) and from 1040 to 1400° C. The joint raising of pressure and temperature resulted in a controlled, uniform reaction on all plate dimensions. After a maximum of 10 hours the reaction was completed. After the pieces were unloaded, a degree of nitriding was established of 92 to 100%. The densities amounted to 2.0 kg/dm$^3$ to 2.3 kg/dm$^3$.

EXAMPLE 2

Silicon powder with an average grain size of less than 15 μm was mixed with Si$_3$N$_4$ powder having an average grain size of less than 15 μm in the proportions 9:1 and 8:2. Added to this powder in each case was 3 to 10% by weight of Al$_3$O$_3$ and Y$_2$O$_3$. Powder mixed in this way was pressed with a cold isostatic press into plates having the dimensions (mm):

```
260 × 130 × 10
260 × 130 × 18
260 × 130 × 25
260 × 130 × 30,
``` and treated afterwards in the hot isostatic press under the same conditions as indicated in example 1.

The nitrided molding plates produced in this way displayed densities of greater than 2.3 to 3.0 and a degree of nitriding greater than 95%.

EXAMPLE 3

Si powder having an average grain size of less than 15 μm was mixed with a boron nitride powder having an average grain size of less than 15 μm in the proportions

```
1:9
3:7
1:1,
``` and afterwards was pressed cold isostatically into cylinders 60 mm in diameter and 100 mm in length. These cylinders were placed in the hot isostatic press facility and were treated under the same conditions as specified in example 1. Measurements showed that the Si powder nitrided fully and resulted in a coherent network in which the boron nitride was retained. The firmness of the article increased with increasing Si content.

The cycle of nitridation of Si molded articles according to the above examples can be run as outlined in the following tables 1 to 3.

TABLE 1

| Segment | Heat-up Time (min.) | Heat to Temp. (°C.) | Hold Time (min.) | Hold Temp. (°C.) | Pressure (MPa) |
|---|---|---|---|---|---|
| 1 | 70 | 1040 | 80 | 1040 | 1.0 |
| 2 | 20 | 1130 | 60 | 1130 | 1.0 |
| 3 | 10 | 1160 | 40 | 1160 | 1.0 |
| 4 | 10 | 1190 | 60 | 1190 | 1.2 |
| 5 | 10 | 1220 | 15 | 1220 | 1.5 |
| 6 | 5 | 1230 | 60 | 1230 | 2.0 |
| 7 | 5 | 1240 | 45 | 1240 | 3.0 |
| 8 | 5 | 1260 | 10 | 1240 | 4.0 |
| 9 | 5 | 1270 | 10 | 1270 | 4.9 |
| 10 | 5 | 1280 | 10 | 1280 | 4.9 |
| 11 | 70 | 1420 | 30 | 1420 | 4.9 |

Total = 635 minutes = 10.58 hours

TABLE 2

| Segment | Heat-up Time (min.) | Heat to Temp. (°C.) | Hold Time (min.) | Hold Temp. (°C.) | Pressure (MPa) |
|---|---|---|---|---|---|
| 1 | 70 | 1130 | 80 | 1130 | 0.5 |
| 2 | 10 | 1160 | 40 | 1160 | 1.0 |
| 3 | 10 | 1190 | 60 | 1190 | 1.2 |
| 4 | 10 | 1220 | 15 | 1220 | 1.5 |
| 5 | 5 | 1230 | 60 | 1230 | 2.0 |
| 6 | 5 | 1240 | 45 | 1240 | 3.0 |
| 7 | 5 | 1260 | 10 | 1240 | 4.0 |
| 8 | 5 | 1270 | 10 | 1270 | 4.9 |
| 9 | 5 | 1280 | 10 | 1280 | 4.9 |
| 10 | 70 | 1420 | 60 | 1420 | 4.9 |

Total = 585 minutes = 9.75 hours

TABLE 3

| Segment | Heat-up Time (min.) | Heat to Temp. (°C.) | Hold Time (min.) | Hold Temp. (°C.) | Pressure (MPa) |
|---|---|---|---|---|---|
| 1 | 50 | 1130 | 60 | 1130 | 0.5 |
| 2 | — | — | 50 | 1130 | 1.0 |
| 3 | 10 | 1160 | 40 | 1160 | 1.0 |
| 4 | 10 | 1190 | 30 | 1190 | 1.2 |
| 5 | 10 | 1220 | 10 | 1220 | 1.5 |
| 6 | 5 | 1230 | 10 | 1230 | 2.0 |
| 7 | 5 | 1240 | 10 | 1240 | 3.0 |
| 8 | 10 | 1280 | 10 | 1270 | 4.9 |
| 9 | 40 | 1420 | 70 | 1420 | 4.9 |

Total = 420 minutes = 7.0 hours

What is claimed is:

1. A method of producing a molded article of reactively combined silicon nitride comprising:
   (a) bringing pure silicon powder or a powder mixture of pure silicon and its nitride into a desired shape having a thickness of greater than 10 mm through cold isostatic pressing, slip casting or diecasting;
   (b) heating the obtained body in a nitrogen atmosphere, reacting the body with nitrogen starting at a nitrogen pressure of 0.5–2.0 MPa and a temperature of 1000° C.;
   (c) raising the temperature and the pressure at least in part step-by-step to a final pressure of 4.9 MPa and a final temperature of at most 1420° C. for a reaction time to obtain said molded article of silicon nitride with a uniform degree of nitriding of at least 92%;
   (d) the entire cycle time of said process without cooling being less than 24 hours.

2. The method of claim 1, wherein the whole raising of the pressure and the temperature takes place step-by-step, the pressure and temperature values being kept constant during a pause between steps.

3. The method of claim 1, wherein the entire cycle time amounts to 10 hours.

4. The method of claim 2, wherein the ratio of the heating periods to the pauses amounts to 1:1.8 to 2.2.

5. The method of claim 1, wherein the reaction time amounts to 3–20 hours.

6. The method of claim 3 wherein the reaction time amounts to 8 hours.

7. The method of claim 1, wherein the raising of pressure and temperature takes place in 5–15 steps.

8. The method of claim 1, wherein the reaction starts at a furnace temperature of at least 1000° C., the reaction rate controlled first by the pressure, and the furnace temperature and pressure being raised by intervals of about 10° C. or about 0.2 MPa, respectively, only when the reaction is advanced.

9. The method of claim 1, wherein said pure silicon powder has a density of 1.3 to 2.3 kg/dm$^3$.

10. The method of claim 1, wherein said powder mixture of pure silicon and its nitride contains 1–30% by weight of $Si_3N_4$.

11. The method of claim 1 wherein said powder mixture of pure silicon and its nitride contains 20% by weight of $Si_3N_4$.

12. The method of claim 1, wherein further nitrides and oxides are added to said silicon powder or powder mixture.

13. The method of claim 1, wherein said silicon powder or powder mixture has a particle size of less than 15 microns.

* * * * *